UNITED STATES PATENT OFFICE.

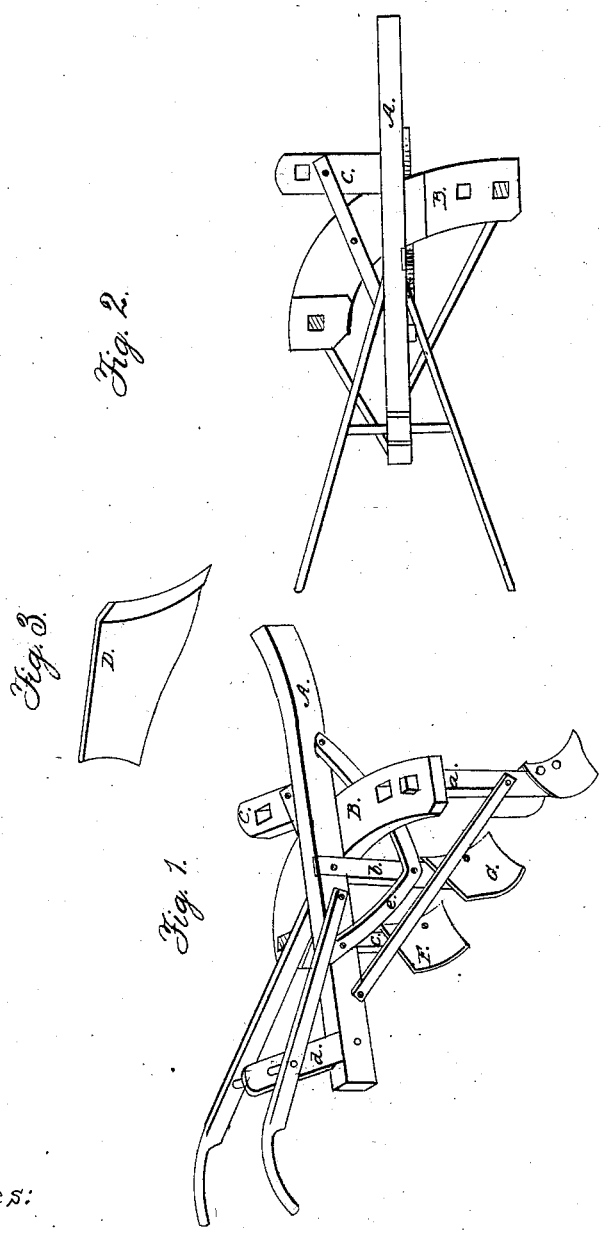

G. T. BENNETT, OF MOUNT OLIVE, NORTH CAROLINA.

IMPROVEMENT IN CORN AND COTTON CULTIVATORS.

Specification forming part of Letters Patent No. 27,962, dated April 24, 1860.

*To all whom it may concern:*

Be it known that I, G. T. BENNETT, of Mount Olive, in the county of Wayne and State of North Carolina, have invented certain new and useful Improvements in Corn and Cotton Cultivators; and I do hereby declare the following to be a full, clear, and exact description of the same, reference being had to the accompanying drawings, and to the letters of reference marked thereon.

The nature of my invention consists in the combination and arrangement of such devices as will be hereinafter particularly set forth.

To enable others skilled in the art to make and use my invention, I will proceed to describe its construction and operation.

Figure 1 is a perspective. Fig. 2 is a plan view. Fig. 3 shows the construction of the cotton-scraper.

In Fig. 1, A represents the main or straight beam.

B is a curved beam, crossing on the under side and secured to the straight beam A, as fully shown in Figs. 1 and 2. It will be observed that the curved beam B is so constructed that it will admit of the adjustment of the stock $a$, and thus be made to accommodate the distance between the plow on stock $a$ and that on stock $b$ to the necessity of the occasion—as, for instance, where the same machine is used both for the cultivation of cotton and corn, the width of the rows being different a corresponding change of course must be made in the distance between the plows.

C represents a side beam, which is provided also with a square hole, as shown in the figures, for the reception of the stock $c$. This, however, I seldom use, except in the cultivation of cotton. The cotton-scraper D is then secured to the stock $c$ in place of the plow F. I use this peculiar shape or form of cotton-scraper for the purpose of merely scraping the weeds from the cotton, instead of plowing them up, which, if done sufficiently close to the cotton to remove the weeds entirely, injures it more or less.

$a$ and $c$ are stocks in the curved beam B, and, as already shown, may be adjusted as occasion requires. $b$ is also a stock secured to the main beam A.

G represents a double-mold turn-plow secured to stock $b$.

$f$ represents a side turn-plow which is secured to stock $c$.

$d$ is a brace which mutually supports the handles and the hind end of the main beam A, as fully shown. $e$ is also a brace for stock $b$.

In operating my machine the various plows—such as double-mold turn side turn plows and cotton-scraper—are designed to occupy such places as the circumstances of the case require.

Having thus fully described my invention, what I claim, and desire to secure by Letters Patent, is—

The curved beam B, as constructed, in combination with the straight beam A, side beam, C, braces $d$ and $e$, stocks $a\ b\ c$, side and double turn-plows F and G, and cotton-scraper D, the whole being arranged in relation to each other, substantially as and for the purpose set forth.

G. T. BENNETT.

Witnesses:
W. J. POLLOCK,
JOEL LOFTIN.